(12) United States Patent
Nishida (10) Patent No.: US 7,642,749 B2
(45) Date of Patent: Jan. 5, 2010

(54) RECHARGEABLE BATTERY, AND APPARATUS AND METHOD OF CHARGING THE SAME

(75) Inventor: Hideyuki Nishida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 362 days.

(21) Appl. No.: 10/806,162

(22) Filed: Mar. 23, 2004

(65) Prior Publication Data

US 2004/0189250 A1 Sep. 30, 2004

(30) Foreign Application Priority Data

Mar. 25, 2003 (JP) .............................. 2003-083522

(51) Int. Cl.
*H02J 7/00* (2006.01)
(52) U.S. Cl. ....................... 320/119; 320/107; 320/112; 320/113
(58) Field of Classification Search ................. 320/119, 320/112, 113, 107, 116, 118
See application file for complete search history.

(56) References Cited

U.S. PATENT DOCUMENTS

| | | | |
|---|---|---|---|
| 5,583,871 A | 12/1996 | Simmonds et al. ............ 320/30 |
| 5,818,202 A | 10/1998 | Miyamoto et al. .......... 320/125 |
| 6,034,506 A * | 3/2000 | Hall ............................ 320/117 |
| 6,104,165 A | 8/2000 | Miyamoto et al. .......... 320/125 |
| 6,239,579 B1 * | 5/2001 | Dunn et al. .................. 320/119 |
| 6,462,511 B1 * | 10/2002 | Kwok ......................... 320/119 |
| 6,573,687 B2 | 6/2003 | Kimura et al. | |
| 6,642,692 B2 * | 11/2003 | Kinoshita ................... 320/112 |

FOREIGN PATENT DOCUMENTS

| | | |
|---|---|---|
| JP | 6-76812 | 3/1994 |
| JP | 6-319287 | 11/1994 |
| JP | 7-327323 | 12/1995 |
| JP | 2732204 | 12/1997 |
| JP | 2743155 | 2/1998 |
| JP | 2000-164260 | 6/2000 |
| JP | 2003-23736 | 1/2003 |
| JP | 2003-157908 | 5/2003 |

OTHER PUBLICATIONS

Japan Official Action dated Apr. 4, 2008 in Japanese Application No. 2003-083522.

* cited by examiner

*Primary Examiner*—Edward Tso
*Assistant Examiner*—Richard V Muralidar
(74) *Attorney, Agent, or Firm*—Fitzpatrick, Cella, Harper & Scinto

(57) ABSTRACT

To maximize the life of a rechargeable battery and the life of cells forming the rechargeable battery, the rechargeable battery is so constructed that each of the cells forming the rechargeable battery can be charged independently of the other cells. To charge this rechargeable battery, a cell to be charged is selected, and the selected cell is charged.

3 Claims, 11 Drawing Sheets

RECHARGEABLE BATTERY, AND APPARATUS AND METHOD OF CHARGING THE SAME

FIELD OF THE INVENTION

The present invention relates to a rechargeable battery and an apparatus and method of charging it and, more particularly, to a rechargeable battery such as a battery pack and its charging.

BACKGROUND OF THE INVENTION

Today, information networks are progressing, and the advancement of mobile electronic apparatuses such as cell phones, notebook PCs, digital cameras, and digital video cameras is remarkable. A battery is one of important parts for supporting high performance and maintaining high portability of these apparatuses. In particular, secondary batteries such as Nickel Cadmium (Ni—Cd), Nickel Metal Hydride (NiMH), and Lithium Ion (Li-ion) batteries are reusable by charging during the cycle life of each battery. Therefore, these secondary batteries are good for the environment because their waste amount is smaller than that of primary batteries which are discarded after being used once.

Secondary batteries are presumably rechargeable 200 to 500 times. In practice, however, a battery pack which is not repetitively recharged many times often becomes unable to be recharged, or, even when the battery pack is rechargeable, its voltage quickly decreases to shorten the time of usage before the next charging. In other words, a so-called drop in battery capacity is often experienced.

One cause is, for example, a phenomenon generally called a "memory effect" of the Ni—Cd battery and the like. If recharging is performed while the depth of discharge is shallow, a drop in voltage occurs early compared to the actual capacity of the battery, and the usable capacity decreases. However, this memory effect can be recovered by a refreshing operation which discharges the battery to a voltage requiring recharging.

Unfortunately, even though this refreshing operation is performed, a battery pack operates worse and the life of the battery is shorter than expected in some cases.

The present inventors, therefore, examined unrechargeable battery packs by disassembling them and found that some or all of a plurality of cells forming an unrechargeable battery pack have an extremely low terminal voltage or opposite polarities. That is, so-called pole reversal occurs to make it impossible to hold the charging voltage of the battery pack. Consequently, even when the battery pack is attached to a charger, a protection circuit of the charger operates to make charging impossible. This phenomenon is disclosed in Japanese Patent Publication No. 2732204 and Japanese Patent Publication No. 2743155 (paragraphs 8 to 23).

Figure 1:
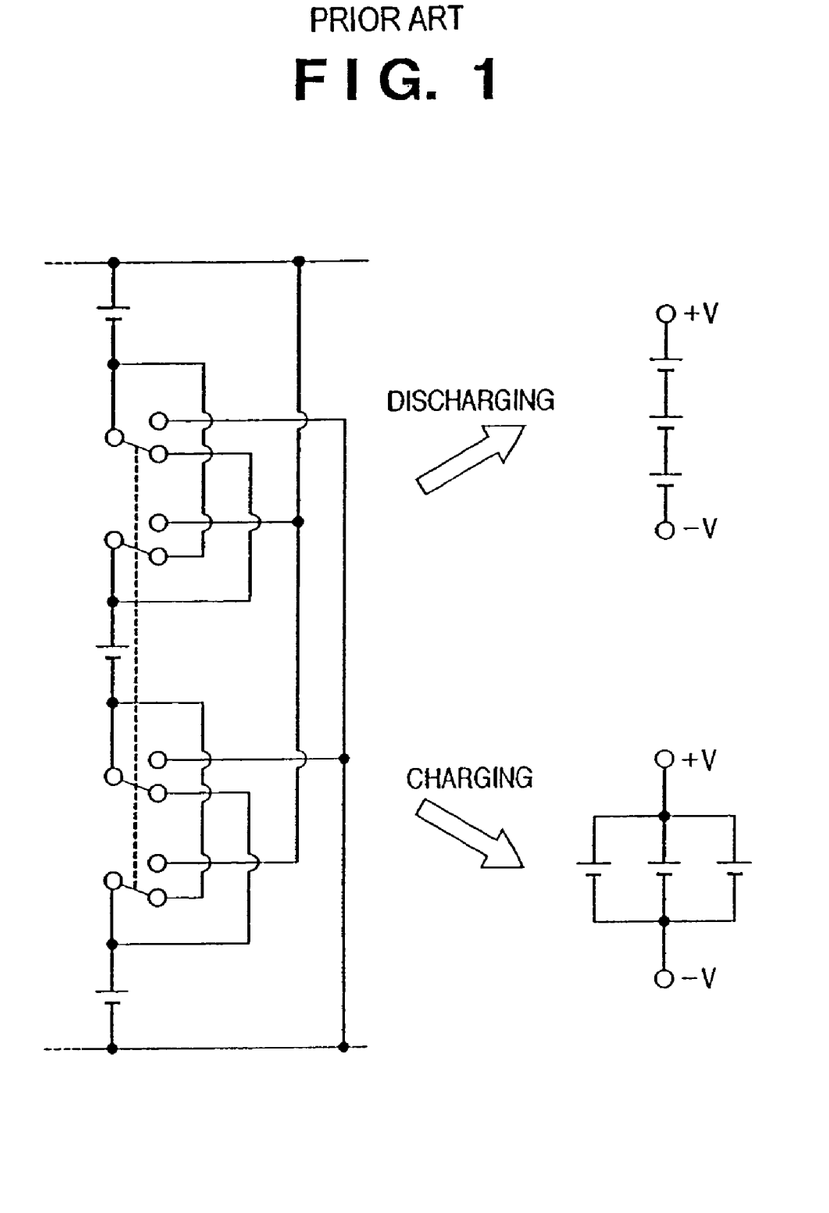
FIG. 1 is a view for explaining a conventional method of switching the connections of cells.

In principle, no pole reversal occurs if a battery pack is formed by secondary battery cells having exactly the same characteristics. In reality, however, it is impossible to make such secondary battery cells having exactly the same characteristics. Pole reversal unavoidably occurs in a battery pack which obtains a desirable voltage by connecting a plurality of batteries in series. As a method of solving this problem, a technique disclosed in Japanese Patent Laid-Open No. 7-327323 is proposed. This technique relates to a battery apparatus having a means for switching the connections of a rechargeable battery forming a battery pack. As shown in FIG. 1, a desired voltage is obtained during discharge by connecting cells in series, but these cells are connected in parallel during charging.

The above method of switching the connections has the following drawbacks:

(1) Even if dendrite grows in only one of the secondary battery cells forming a rechargeable battery to cause inconveniences (e.g., an internal electrode short circuit), other parallel-connected normal secondary battery cells discharge. In this case, no charging voltage can be applied to these parallel-connected normal cells, so the battery pack cannot be charged.

(2) Because the characteristics of cells forming a rechargeable battery are not exactly the same, variations in internal resistances of these cells make the effective voltages applied to the cells unequal to each other even when these cells are connected in parallel. That is, a cell having a higher internal resistance is fully charged later than the other cells. Accordingly, if charging is continued until this cell having the highest internal resistance is fully charged, cells having low internal resistances are overcharged. In contrast, if charging is terminated when a cell having a lower internal resistance is fully charged, cells having high internal resistances are used up as they are insufficiently charged. These insufficiently charged cells are connected in series during discharging and completely discharge first, allowing the easy occurrence of pole reversal.

SUMMARY OF THE INVENTION

The present invention individually or collectively solves the above problems, and has as its object to make it possible to individually charge cells forming a rechargeable battery.

It is another object of the present invention to individually charge cells forming a rechargeable battery.

One aspect of the present invention discloses a rechargeable battery which includes a plurality of connected cells, comprising: a first electrode which extracts electric power from the battery; and a second electrode which is different from the first electrode and charges and discharges each of the plurality of cells.

Another aspect of the present invention discloses a charger for charging a battery which includes a plurality of connected cells, comprising: a plurality of electrodes which electrically connect to the plurality of cells forming the battery; a selector which selects a cell to be charged; a charging and discharging section which supplies a charging/discharging current to a selected cell; and a controller which controls the selector and charging and discharging section.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Charging methods of embodiments according to the present invention will be described in detail below with reference to the accompanying drawings. Note that a rechargeable battery using four cells will be explained as an example only, but the number of cells could be any arbitrary number of 2 or more. Also, the arrangement of a rechargeable battery explained below is simplified by omitting portions unnecessary for the explanation. For example, a terminal called an Ident terminal for identifying the type of rechargeable battery is omitted.

First Embodiment

[Rechargeable Battery]

Figure 2:
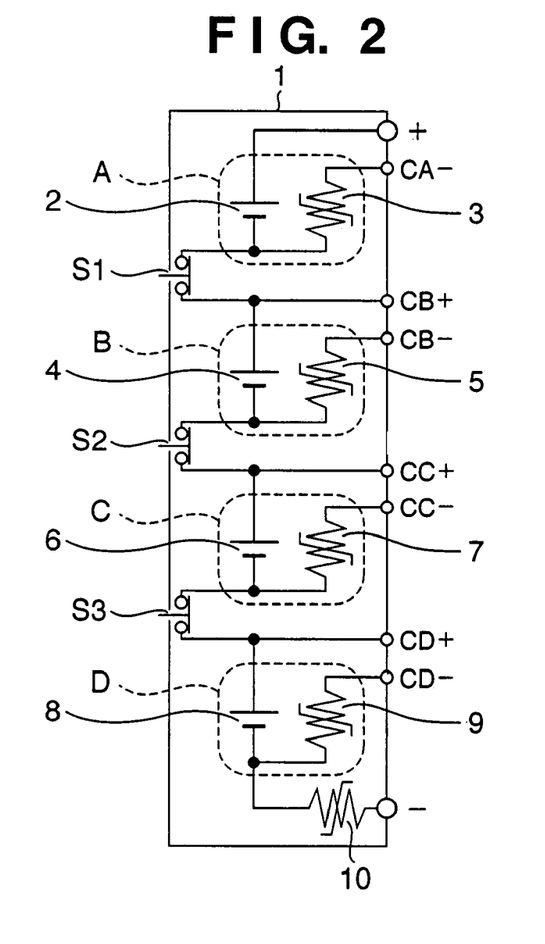
FIG. 2 is a view showing the arrangement of a rechargeable battery of the first embodiment.

FIG. 2 is a view showing the arrangement of a rechargeable battery 1 of the first embodiment.

Referring to FIG. 2, portions A, B, C, and D enclosed by the dotted lines inside the rechargeable battery 1 are secondary battery cells. These secondary battery cells include cells 2, 4, 6, and 8 and overcurrent/overheating protecting elements 3, 5, 7, and 9. As this overcurrent/overheating protecting element, a PTC (Positive Thermistor Cell) called POLYSWITCH (the registered trademark of Raychem) or the like is used. The rechargeable battery 1 has a protection function for each secondary battery cell. That is, the cell 2 and overcurrent/overheating protecting element 3 form the secondary battery cell A, the cell 4 and overcurrent/overheating protecting element 5 form the secondary battery cell B, the cell 6 and overcurrent/overheating protecting element 7 form the secondary battery cell C, and the cell 8 and overcurrent/overheating protecting element 9 form the secondary battery cell D.

Note that a Li-ion battery has a particularly high energy density, so safety must be ensured by forming an overcurrent/overheating protecting element inside a secondary battery cell. However, when a Li-ion battery already containing an overcurrent/overheating protecting element is to be used as a secondary battery cell, no other overcurrent/overheating protecting element needs be prepared outside this secondary battery cell.

These secondary battery cells are connected in series via push button switches S1, S2, and S3 to form the rechargeable battery 1. That is, the push button switches S1, S2, and S3 are arranged between the secondary battery cells A and B, B and C, and C and D, respectively. When the rechargeable battery 1 is to be discharged, these push button switches are closed (turned on).

An overcurrent/overheating protecting element 10 has a function of protecting the overall rechargeable battery 1. The above components are connected in series to form the rechargeable battery 1.

A CA− terminal, CB+ terminal, CB− terminal, CC+terminal, CC− terminal, CD+ terminal, and CD− terminal as the characteristic features of the rechargeable battery 1 will be described below.

These terminals independently access the cells when the push button switches S1, S2, and S3 are pushed and opened (turned off). That is, when the push button switch S1 is opened, the secondary battery cell A is disconnected from the rechargeable battery 1 and accessible only from the + terminal and CA− terminal. Likewise, when the push button switches S1 and S2 are opened, the secondary battery cell B is accessible only from the CB+ terminal and CB− terminal. When the push button switches S2 and S3 are opened, the secondary battery cell C is accessible only from the CC+ terminal and CC− terminal. When the push button switch S3 is opened, the secondary battery cell D is accessible only from the CD+ terminal and CD− terminal.

Figure 3:
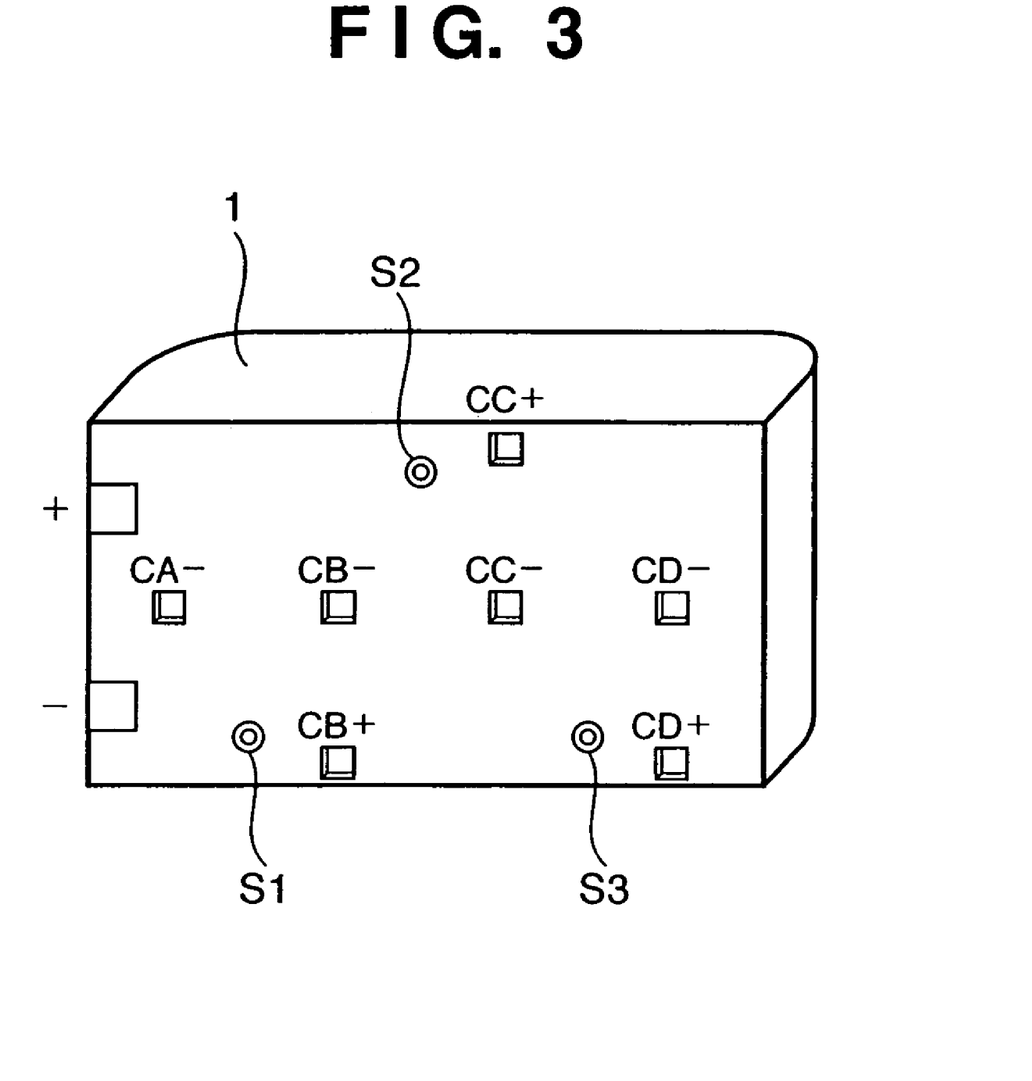
FIG. 3 is a view showing the external appearance of the rechargeable battery of the first embodiment in the form of a battery pack.
Figure 4:
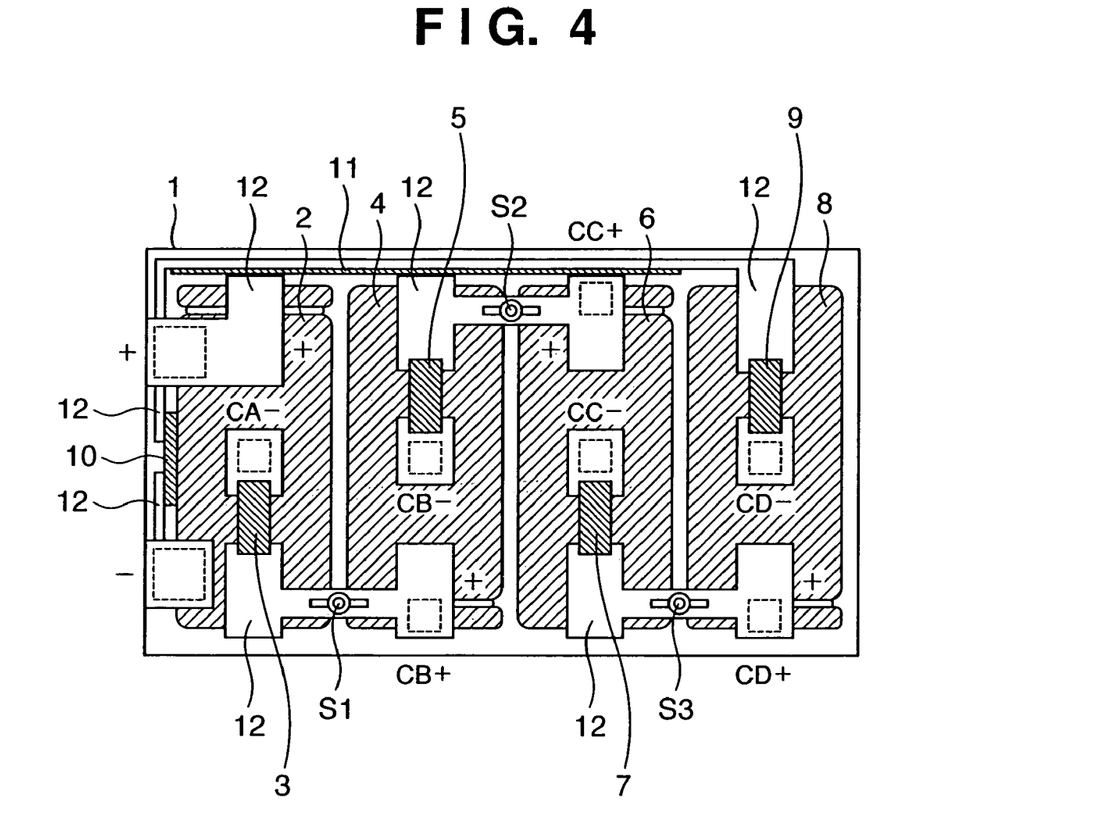
FIG. 4 is a perspective view showing the internal structure of the rechargeable battery of the first embodiment when viewed from a terminal surface.

FIG. 3 is a view showing the external appearance of the rechargeable battery 1 in the form of a battery pack. Referring to FIG. 3, the rechargeable battery 1 is viewed from a surface (terminal surface) having terminals serving as contacts to a charger (not shown). FIG. 4 is a perspective view showing the internal structure of the rechargeable battery 1 viewed from the terminal surface.

The push button switches S1, S2, and S3 are so arranged that they are pushed when the rechargeable battery 1 is attached to a charger, and are not pushed during, among others, discharging when the rechargeable battery 1 is attached to another apparatus or the like. The CA−, CB+, CB−, CC+, CC−, CD+, and CD− terminals are arranged at the bottoms of openings formed when the rechargeable battery 1 is molded into a battery pack, so that these terminals are not easily touched. As will be described later, a rechargeable battery attaching portion of the charger has projections which push the push button switches at the bottoms of the openings in the rechargeable battery 1. It is also possible to form projections projecting from the openings in the rechargeable battery 1, and push the push button switches by pushing these projections into the openings when the rechargeable battery 1 is attached to the charger. In short, it is only necessary to prepare a means by which the secondary battery cells are electrically separated to become independent of each other when the rechargeable battery 1 is attached to the charger.

In FIG. 4, portions indicated by reference numeral 12 are metal wiring plates which connect the push button switches and overcurrent/overheating protecting elements. Reference numeral 11 denotes an insulating plate sandwiched between the metal wiring plates 12 to prevent a short circuit in the rechargeable battery 1, since the metal wiring plates 12 are not insulated. A portion of each metal wiring plate 12 is exposed to the outside as a terminal through a hole formed in the mold.

[Connection to Load]

Figure 5:
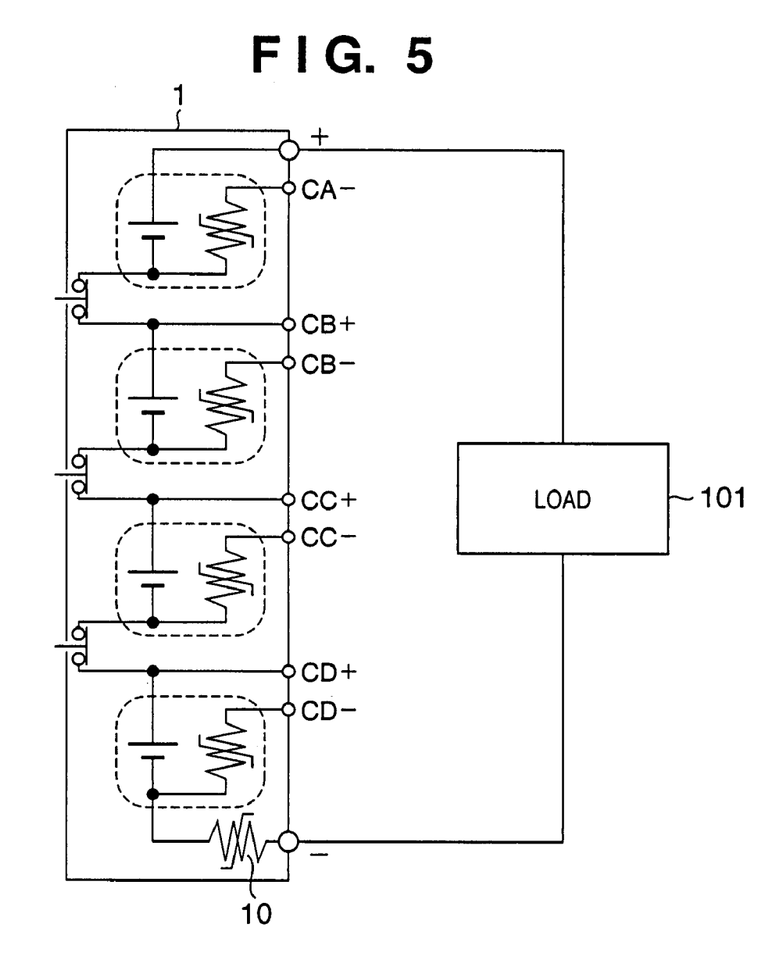
FIG. 5 is a view showing the connection (during discharging) between the rechargeable battery of the first embodiment and a load.

FIG. 5 is a view showing the connection (during discharging) of the rechargeable battery 1 and a load 101. The load 101 is a mobile electronic apparatus such as a digital video camera, digital camera, notebook PC, or cell phone. When the rechargeable battery 1 is attached to the load 101, the + and − terminals of the rechargeable battery 1 are connected to the load 101, and the overcurrent/overheating protecting element 10 functions as a safety device.

As described above, when the rechargeable battery 1 is attached to the load 101, the push button switches S1 to S3 are not mechanically pushed but kept closed. Accordingly, the individual cells are connected in series to supply electric power having a necessary voltage to the load 101 as an electronic apparatus.

[Connection to Charger]

Figure 6:
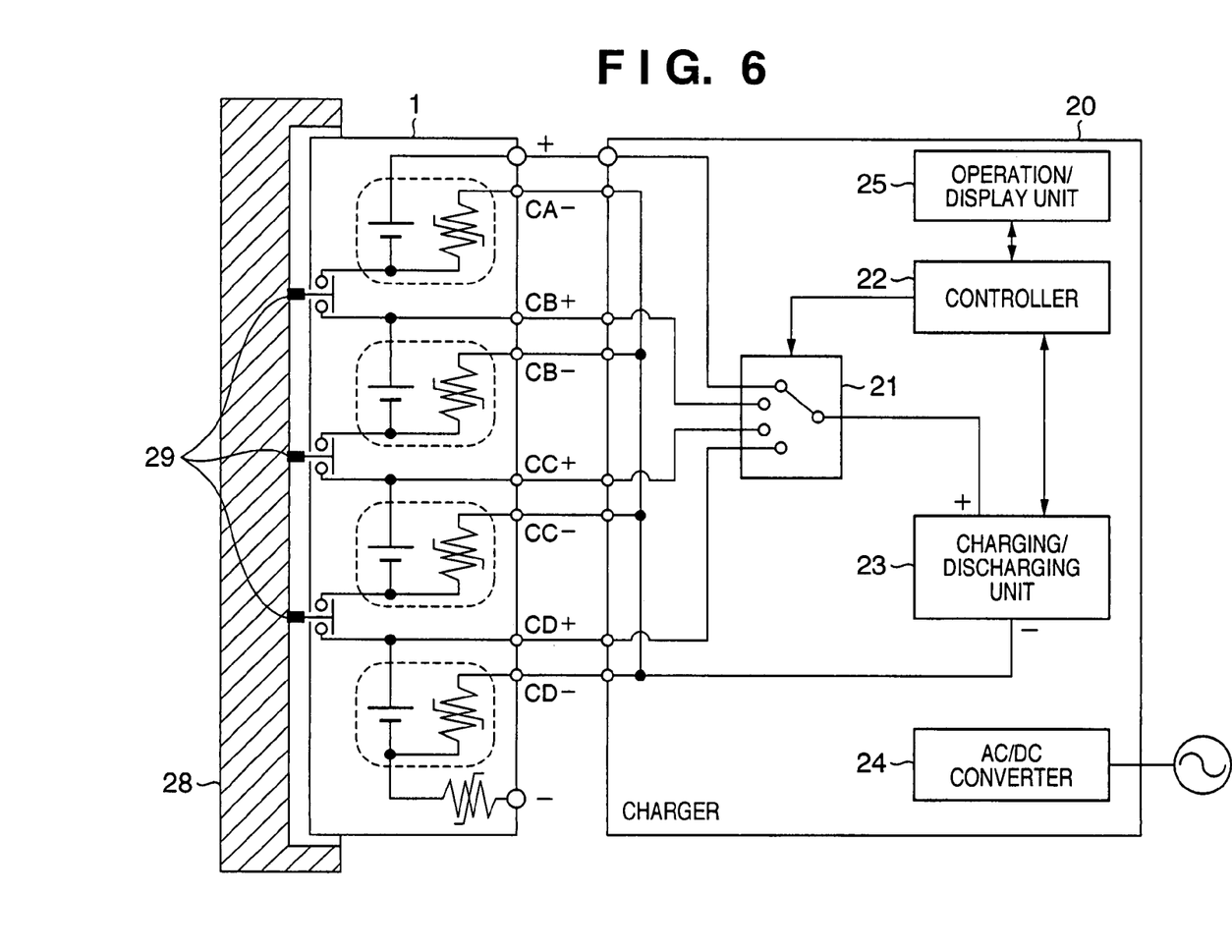
FIG. 6 is a block diagram showing the electrical connection (during charging) between the rechargeable battery of the first embodiment and a charger.

FIG. 6 is a block diagram showing the electrical connection (during charging) of the rechargeable battery 1 and a charger 20.

Referring to FIG. 6, a controller 22 of the charger 20 is a one-chip microcontroller or the like. Although details will be described later, the controller 22 sets a charge cell select switch 21 in accordance with the operation of a switch or the like of an operation/display unit 25, controls a charging/discharging unit 23 to control charging or discharging of each cell, and displays a charge/discharge state by using an indicator such as an LED of the operation/display unit 25. An AC/DC converter 24 supplies electric power to each block of the charger 20. The charging/discharging unit 23 includes a voltage/current detector which detects the terminal voltage and charge/discharge current of a selected cell, and converts them into digital information having necessary accuracy.

Reference numeral 28 denotes the section, schematically illustrated, of the charger 20. When the battery 1 is attached to the charger 20, the switches are pushed by projections 29 described earlier and opened.

Figure 7:
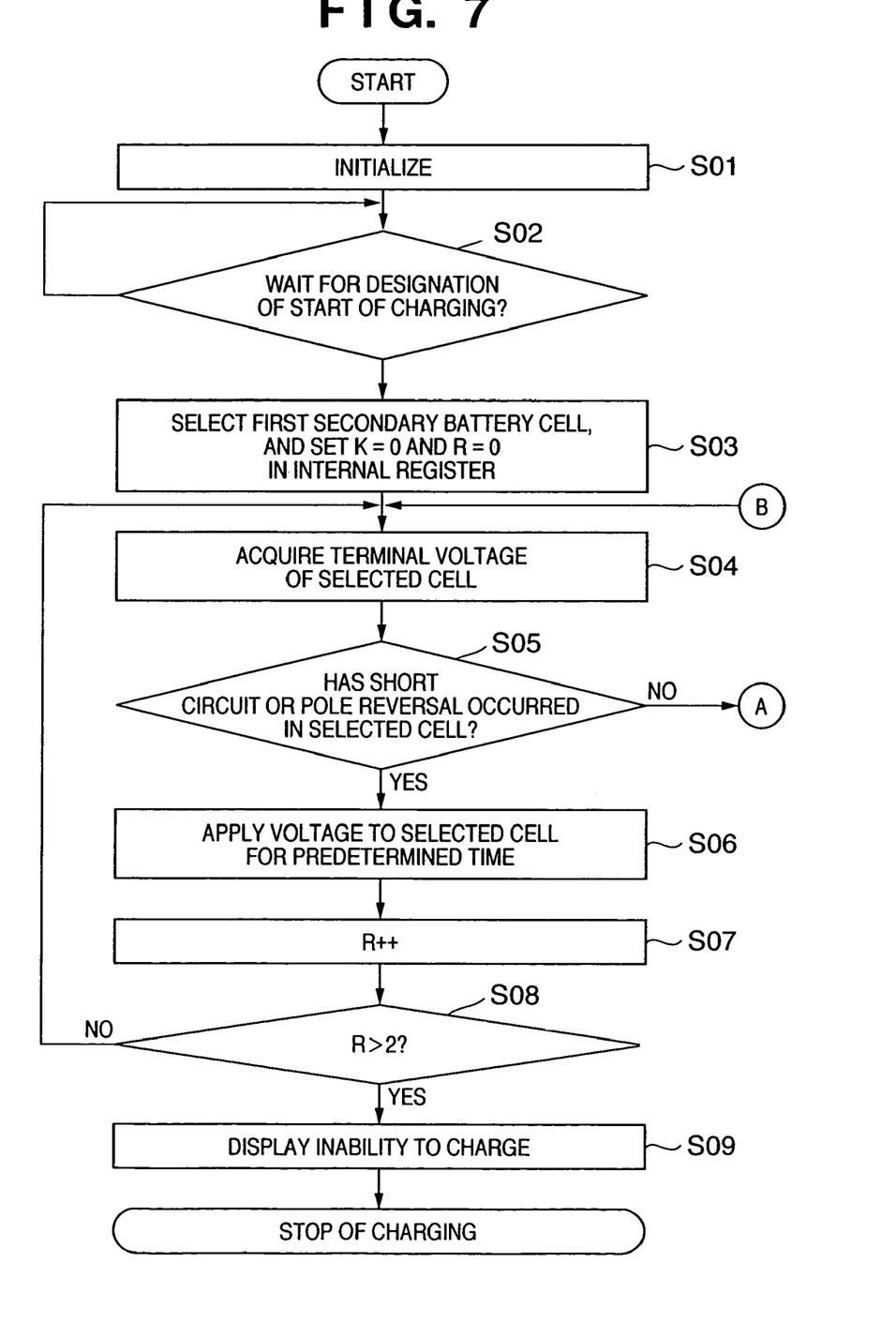
FIGS. 7 and 8 are flow charts showing a charging operation performed by a controller of the charger.
Figure 8:
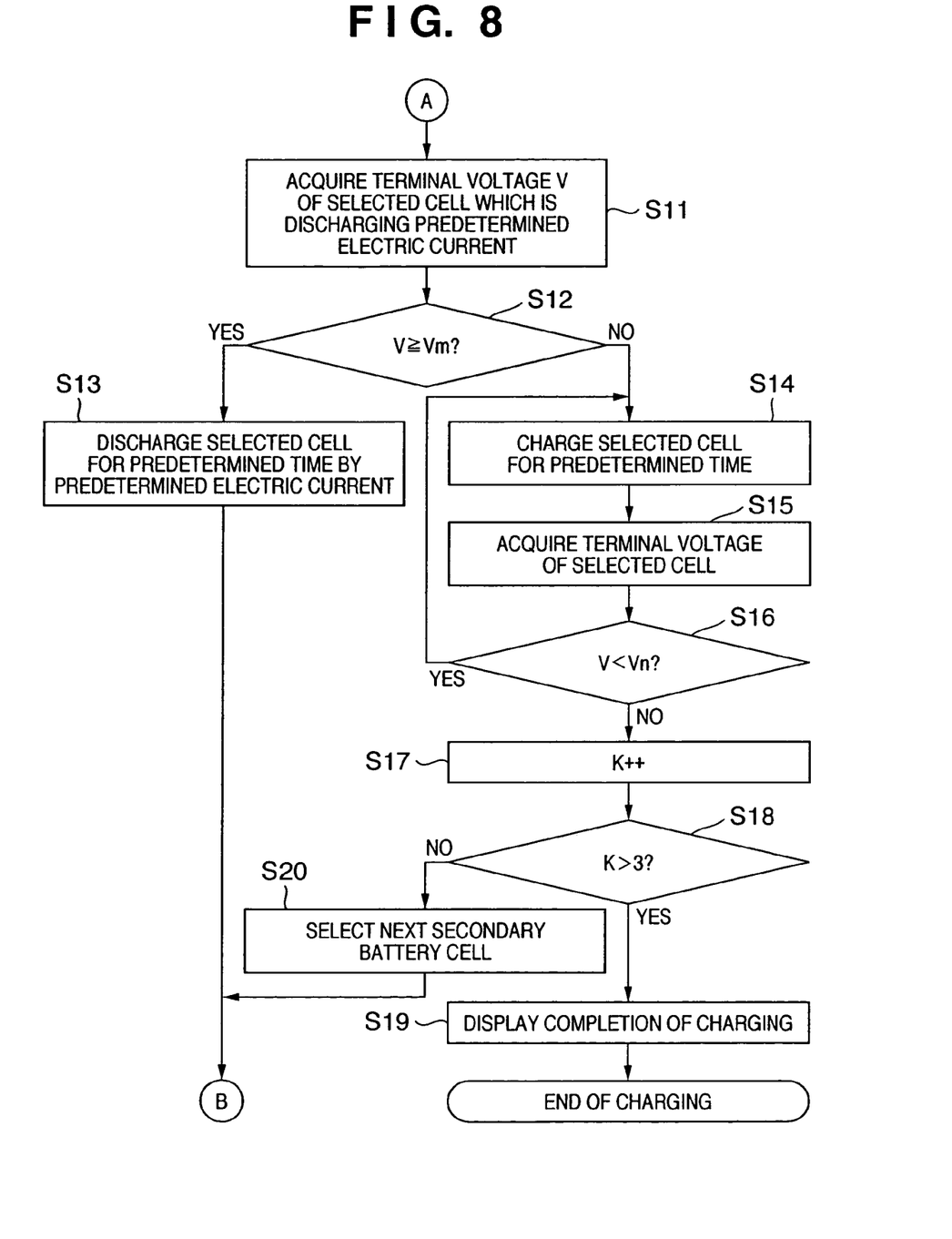

FIGS. 7 and 8 are flow charts showing a charging operation performed by the controller 22 of the charger 20. Although various charging methods are possible in the first embodiment, a method of charging the cells one by one will be explained below.

First, when the charger 20 is connected to a plug socket of the commercial power supply, the AC/DC converter 24 supplies electric power to each unit, and the controller 22 starts the charging operation in accordance with a control program stored in an internal ROM.

The controller 22 first initializes the charger 20 (S01), and then waits for instructions from the operation/display unit 25 (S02) (charging preparations are complete). A user attaches, to the charger 20, the rechargeable battery 1 detached from the load 101 so as to be charged. Note that the charger 20 has a protection circuit (not shown) so that the same operation is performed even when the charger 20 is connected to a plug socket after the rechargeable battery 1 is attached to the charger 20.

When the rechargeable battery 1 is attached, the push button switches S1 to S3 of the rechargeable battery 1 are mechanically pushed and opened as shown in FIG. 6. Also, the rechargeable battery 1 is electrically connected to the charger 20 via the +, CA−, CB+, CB−, CC+, CC−, CD+, and CD− terminals. Of these terminals, the CA−, CB−, CC−, and CD− terminals are connected together to the negative electrode of the charging/discharging unit 23 in the charger 20. The +, CB+, CC+, and CD+ terminals are connected to selectable electrodes of the charge cell select switch 21. A selecting electrode of the switch 21 is connected to the positive electrode of the charging/discharging unit 23.

When the start of charging is designated from the operation/display unit 25, the controller 22 starts a cell test. First, the controller 22 controls the charge cell select switch 21 to select the first secondary battery cell (in this example, the secondary battery cell A and called a "selected cell"), and sets two values, that are, K=0 indicating the cell number and R=0 indicating the number of times of recovery, in an internal register (not shown) (S03).

Subsequently, the controller 22 acquires the terminal voltage of the selected cell via the charging/discharging unit 23 (S04), and determines whether a short circuit or pole reversal occurs in the selected cell (S05). If a short circuit or pole reversal occurs in the selected cell, the controller 22 executes a cell recovery mode.

In this cell recovery mode, the controller 22 controls the charging/discharging unit 23 to apply, to the selected cell, a voltage opposite to the normal voltage, that is, a voltage which gives a + potential to the positive electrode and a − potential to the negative electrode (S06). This voltage application is performed for a predetermined time while an electric current is limited. The predetermined time is a time during which the selected cell does not generate heat. Although this predetermined time depends upon the type of battery, it is about 10 to 30 sec.

The controller 22 then increments the R value indicating the number of times of recovery in the internal register (S07). If R≦2, the controller 22 returns the flow to step S04 (S08). In this example, if the short circuit or pole reversal is not eliminated even after cell recovery is performed twice in succession, it is determined that the selected cell is unchargeable. That is, if R>2 in step S08 the controller 22 determines that the rechargeable battery 1 is unchargeable, displays the inability to charge on the operation/display unit 25 (S09), and stops the charging operation. This stoppage of the charging operation is maintained until the rechargeable battery 1 is detached from the charger 20 or the charger 20 is disconnected from the plug socket.

If the controller 22 determines that the selected cell has neither a short circuit nor pole reversal, the controller 22 controls the charging/discharging unit 23 to acquire the terminal voltage of the selected cell while the selected cell is discharging a predetermined electric current (S11). The predetermined electric current is set at a value equivalent to the load current of the load 101, normally 1 C or less, by taking account of a voltage drop caused by the memory effect. The controller 22 compares an acquired terminal voltage V of the selected cell with a normal voltage Vm (S12). If V≧Vm, the selected cell has not well discharged, so the flow advances to a cell discharging mode to prevent the memory effect. Note that the normal voltage Vm is about 0.9 V for a Ni—Cd battery, although it depends upon the type or discharge current of secondary battery.

In the cell discharging mode, the controller 22 controls the charging/discharging unit 23 to discharge the selected cell for a predetermined time by the predetermined electric current described above (S13). After that, the controller 22 returns the flow to step S04. By thus returning the flow to step S04, even if a short circuit or the like occurs in the selected cell in this cell-discharging mode, it is possible to detect the short circuit and recover the cell. Note that no pole reversal occurs because the cell discharges alone.

If V<Vm, the flow advances to a cell charging mode. In this cell-charging mode, the controller 22 controls the charging/discharging unit 23 to charge the selected cell (S14). As a charging method performed in this mode, any of several conventional methods can be used. Examples are the method of charging for 8 to 10 hrs at a charging rate of about C/10, the method of charging in the form of a pulse at a high charging rate, and the method of charging at a high rate of about 2C described in Japanese Patent Publication No. 2732204 or 2743155.

After charging the selected cell for a predetermined time in this manner, the controller 22 acquires the terminal voltage of the selected cell via the charging/discharging unit 23 (S15), and compares an acquired voltage V with a normal voltage Vn (S16). If V<Vn, the controller 22 returns the flow to step S14 to continue the charging until the terminal voltage of the selected cell reaches the normal voltage Vn. If the terminal voltage V of the selected cell has reached the normal voltage Vn (V≧Vn), the controller 22 terminates the charging of the selected cell, increments the K value indicating the cell number in the internal register (S17), and compares this K value with the number of cells (in this embodiment, 3) of the rechargeable battery 1 (S18). If K>3, the controller 22 displays the completion of charging on the operation/display unit (S19), and completes the charging operation.

If K≧3, the controller 22 controls the charge cell select switch 21 to select the next secondary battery cell (in this example, the secondary battery cell B) (S20), and returns the flow to step S04 to repeat the various determining operations and charging/discharging pertaining to cell recovery, cell discharging, and cell charging of the remaining secondary battery cell.

As described above, when the rechargeable battery 1 of this embodiment is discharging, the secondary battery cells are connected in series via the closed push button switches S1 to S3, so a necessary voltage can be supplied to the load 101. Since only the overcurrent/overheating protecting element 10 is connected in series, no extra voltage drop is caused by the overcurrent/overheating protecting elements 3, 5, 7, and 9. As a consequence, the energy charged in the rechargeable battery 1 can be effectively used (discharged).

Also, during charging, the secondary battery cells separated by the opened push button switches S1 to S3 can be individually charged/discharged and recovered. Since these secondary battery cells include the overcurrent/overheating protecting elements 3, 5, 7, and 9, each secondary battery cell can be safely protected even if the cell temperature rises by high-rate charging.

Second Embodiment

A charging method of the second embodiment according to the present invention will be described below. In the second embodiment, the same reference numerals as in the first embodiment denote the same parts, and a detailed explanation thereof will be omitted.

Figure 9:
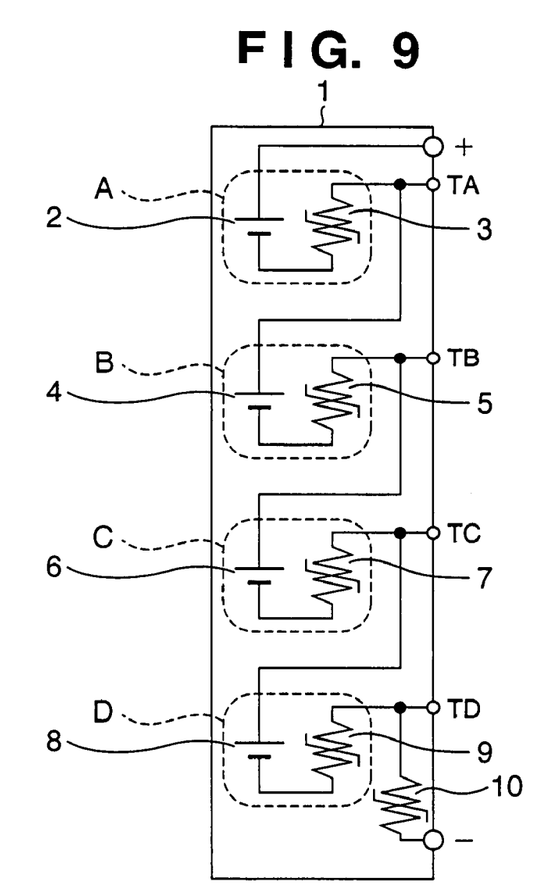
FIG. 9 is a view showing the arrangement of a rechargeable battery of the second embodiment.

FIG. 9 is a view showing the arrangement of a rechargeable battery 1 of the second embodiment. The difference from the rechargeable battery 1 of the first embodiment is that no push button switches are used.

The negative electrode of each secondary battery cell is connected to an external connecting terminal TA, TB, TC, or TD. The positive electrode of a secondary battery cell A is connected to the + terminal, the positive electrodes of secondary battery cells B to D are connected to the negative electrodes of the secondary battery cells A to C, respectively, and the negative electrode of the secondary battery cell D is connected to the − terminal via an overcurrent/overheating protecting element 10. That is, these secondary battery cells are connected in series to form the rechargeable battery 1. The secondary battery cells A, B, C, and D can be accessed by the + terminal and terminal TA, terminals TA and TB, terminals TB and TC, and terminals TC and TD, respectively.

Figure 10:
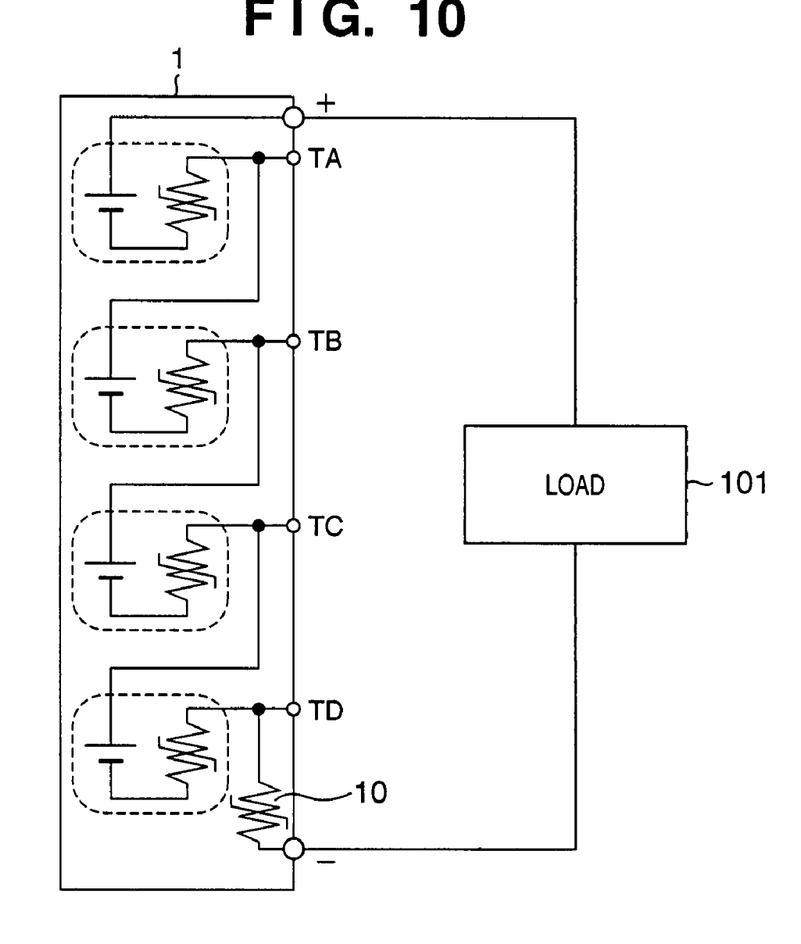
FIG. 10 is a view showing the connection (during discharging) between the rechargeable battery of the second embodiment and a load.

FIG. 10 is a view showing the connection (during discharging) of the rechargeable battery 1 and a load 101. When the rechargeable battery 1 is attached to the load 101, the + and − terminals of the rechargeable battery 1 are connected to the load 101, and electric power having a necessary voltage is applied to the load 101 as an electronic apparatus.

Overcurrent/overheating protecting elements 3, 5, 7, and 9 of the individual secondary battery cells and an overcurrent/overheating protecting element 10 function as safety devices.

Figure 11:
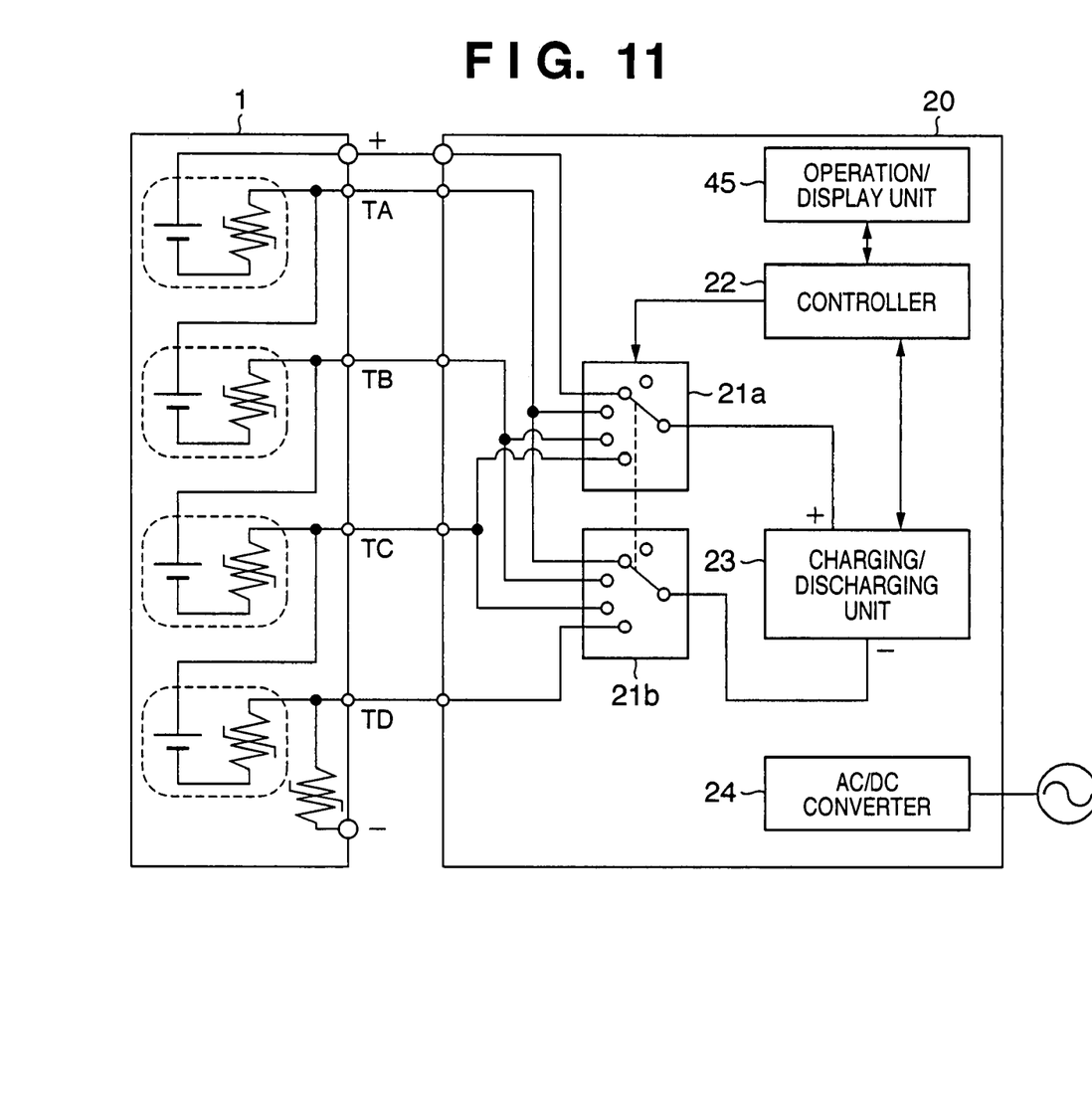
FIG. 11 is a block diagram showing the electrical connection (during charging) between the rechargeable battery of the second embodiment and a charger.

FIG. 11 is a block diagram showing the electrical connection (during charging) of the rechargeable battery 1 and a charger 20.

The charging and discharging operations of the charger 20 are the same as in the first embodiment except that two charge cell select switches are used. That is, a controller 22 selects a secondary battery cell to be charged or discharged by controlling charge cell select switches 21a and 21b whose contacts are switched as they are interlocked with each other.

The form of the rechargeable battery 1 of the second embodiment is effective when the rechargeable battery 1 is charged as it is kept attached to (or incorporated in) the load 101 as an electronic apparatus such as a notebook personal computer or cell phone. In this case, the charger 20 is incorporated into the body of the electronic apparatus or into an external power adaptor of the electronic apparatus. When the charger 20 is included in an electronic apparatus or the like and if the rechargeable battery 1 need not be charged (or can discharge), the controller 22 disconnects the rechargeable battery 1 from the charger 20 by controlling the charge cell select switches 21a and 21b so as to select open contacts.

As described above, the rechargeable battery 1 of the second embodiment can be suitably charged or discharged as it is kept incorporated in an electronic apparatus. In addition, the nonuse of push button switches simplifies the arrangement and reduces the cost.

The arrangement of the second embodiment is also suited to a battery, such as a Li-ion battery, particularly having a high energy density and containing overcurrent/overheating protecting elements inside secondary battery cells. Since double protection is achieved by the built-in overcurrent/overheating protecting elements and the overcurrent/overheating protecting element 10, the safety during discharging can be increased.

In the above embodiments, secondary battery cells forming a battery pack can be individually charged and discharged, so each cell can be optimally charged. This makes it possible to reduce variations in charged states of the individual cells, which cause the occurrence of pole reversal, and maximize the life of the rechargeable battery and the life of the secondary battery cells forming the rechargeable battery.

Also, even if pole reversal occurs in one of secondary battery cells, this cell can be recovered independently of the others. Conventionally, if pole reversal occurs even in one of cells forming a rechargeable battery, this rechargeable battery must be discarded. In the present invention, however, a rechargeable battery which can be recovered in the cell recovery mode need not be discarded. This is effective to save resources and reduce the waste.

In the above description, overcurrent/overheating protecting elements of secondary battery cells are formed on the negative electrode side. However, it is, of course, also possible to form these elements on the positive electrode side.

Furthermore, in principle, the rechargeable batteries and chargers of the embodiments do not limit the types of secondary batteries but can be applied to a broad range of secondary batteries. Accordingly, similar effects can be expected in many electrical apparatuses without departing from the spirit and scope of the present invention.

As many apparently widely different embodiments of the present invention can be made without departing from the spirit and scope thereof, it is to be understood that the invention is not limited to the specific embodiments thereof except as defined in the appended claims.

What is claimed is:

1. A rechargeable battery which includes a plurality of cells and is attached to a charger, the battery comprising:
   a pair of first electrodes configured to extract electric power from the battery;
   a pair of second electrodes which is different from said pair of first electrodes; and
   a switch configured to series connect said plurality of cells to extract electric power from the series-connected plurality of cells through said pair of first electrodes when said switch is in a closed state, and configured to electrically separate said plurality of cells from one another to individually access each of said plurality of cells through said pair of second electrodes when said switch is an open state,
   wherein the charger comprises a charging/discharging unit which charges and discharges each of said plurality of cells individually through said pair of second electrodes, and
   wherein said switch changes from the closed state to the open state when said switch is pressed by a projection placed on an attaching portion of either the battery or the charger and the battery is attached to the charger, and said switch changes from the open state to the closed state when the battery is detached from the charger.

2. The battery according to claim 1, wherein the battery is a battery pack in which said plurality of cells are assembled.

3. A rechargeable battery system comprising:
   a battery which includes a plurality of cells; and
   a charger to which the battery attached,
   wherein said battery comprises:
   a pair of first electrodes configured to extract electric power from said battery;
   a pair of second electrodes which is different from said pair of first electrodes; and
   a switch configured to series connect the plurality of cells to extract electric power from the series-connected plurality of cells through said pair of first electrodes when said switch is in a closed state, and configured to electrically separate the plurality of cells from one another to individually access each of the plurality of cells through said pair of second electrodes when said switch is an open state,
   wherein said charger comprises a charging/discharging unit which charges and discharges each of the plurality of cells individually through said pair of second electrodes, and
   wherein an attaching portion of either said battery or said charger comprises a projection which makes said switch change to the open state from the closed state when said battery is attached to said charger, and said switch changes from the open state to the closed state when said battery is detached from said charger.

* * * * *